United States Patent [19]

Zieg

[11] 4,403,678

[45] Sep. 13, 1983

[54] FOLDING SAW HORSE

[75] Inventor: Steven A. Zieg, Anaheim Hills, Calif.

[73] Assignee: Mansion Industries, Inc., Industry, Calif.

[21] Appl. No.: 316,813

[22] Filed: Nov. 2, 1981

[51] Int. Cl.$^3$ ........................ B27B 21/00; F16M 11/00

[52] U.S. Cl. .................................... 182/153; 182/155; 182/181; 182/225

[58] Field of Search ............... 182/155, 153, 154, 181, 182/182, 183, 184, 226, 186; 248/434, 435

[56] References Cited

U.S. PATENT DOCUMENTS

| | | | |
|---|---|---|---|
| 2,216,187 | 10/1940 | Dion | 182/155 |
| 2,473,342 | 6/1949 | Larson | 182/155 |
| 3,951,233 | 4/1976 | Meyers | 182/155 |
| 4,152,834 | 5/1979 | Stansberry | 182/155 |
| 4,245,718 | 1/1981 | Poston et al. | 182/153 |

*Primary Examiner*—Reinaldo P. Machado
*Attorney, Agent, or Firm*—William W. Haefliger

[57] ABSTRACT

A sturdy, collapsible saw horse has legs which move between collapsed and extended positions, and flexible connectors limit leg movement at extended positions. The saw horse may also have two horizontal frame members which pivotally support the legs, the frame members hinged together for relative lateral movement limited by tensioning of the flexible connectors.

12 Claims, 4 Drawing Figures

FOLDING SAW HORSE

BACKGROUND OF THE INVENTION

This invention relates generally to saw horses, and more particularly to a highly useful saw horse the legs of which move between collapsed and extended positions, and wherein flexible connector means is employed to limit leg movement at extended positions.

There is a need for simple, lightweight, easily collapsible and extensible saw horses, for both commercial construction purposes and use around the home. While folding saw horses are known, they lack the unusual advantages of the present saw horse wherein flexible connector means is used in a unique manner to limit spreading of the legs in extended positions. As a result, prior saw horses lack the simplicity and lightweight, portable characteristics of the present saw horse.

SUMMARY OF THE INVENTION

It is a major object of the invention to provide a highly useful and simple, portable saw horse meeting the above need. Basically, it comprises:

(a) generally horizontally extending upper frame structure, (b) two pairs of legs connected to the frame structure to move between collapsed positions proximate that structure, and extended positions in which the frame structure is supported on the legs, and (c) flexible connector means operatively connected with the legs to limit such movement of the pairs of legs relatively away from one another at said extended positions.

Additionally, the upper frame structure may typically include two longitudinally elongated frame members to which the two legs of each pair are respectively pivotally connnected; hinge means may interconnect the two frame members to accommodate lateral pivoting thereof facilitating lateral spreading of the legs of each pair, and the flexible connector means may be connected with the members to not only limit pivoting of the pairs of legs relatively away from one another generally longitudinally, but also to limit lateral spreading of the legs as accommodated by hinging of the frame members. To this end, the flexible connector means may extend from the frame members to the lower extents of the legs of each pair, and between those lower extents, as will be seen.

Further, nesting or collapse of the legs is facilitated by spacers between certain leg upper portions and the two hinged members, as will be seen, the flexible connector means such as cables hanging loosely in such leg collapsed condition.

These and other objects and advantages of the invention, as well as the details of an illustrative embodiment, will be more fully understood from the following specification and drawings, in which:

DRAWING DESCRIPTION

DETAILED DESCRIPTION

Figures 1, 2, 3, 4:
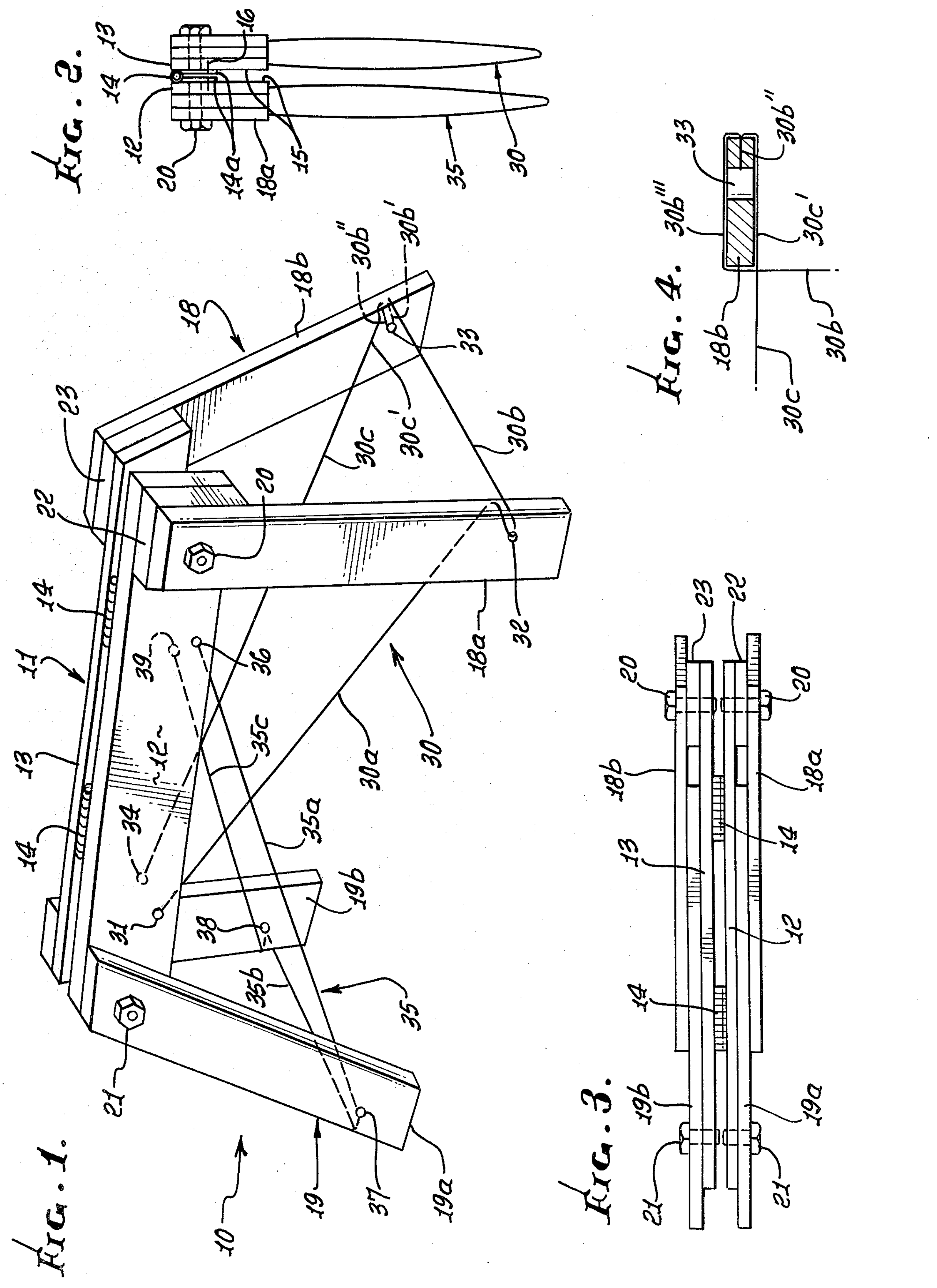
FIG. 1 is a perspective view showing the saw horse in operative, extended condition.
FIG. 2 is an end view showing the saw horse in collapsed condition.
FIG. 3 is a top view showing the saw horse in collapsed condition.
FIG. 4 is a section through a leg.

In the drawings, the saw horse 10 is shown in FIG. 1 in fully extended, operative position. It includes a generally horizontally extending upper frame structure 11, typically incorporting two longitudinally elongated, parallel, like frame members 12 and 13. They may for example consist of wood, and hinges 14 interconnect the upper portions of the members, as shown. See in FIG. 2 the hinge plates **14*a* respectively fastened to the inner opposed upright faces 15 of the members 12 and 13, as by fasteners 16. Accordingly, the members 12 and 13 are adapted to swing laterally relative to one another, i.e. spread apart as shown in FIG. 1**, to fully extended positions.

The saw horse 10 also incorporates two pairs 18 and 19 legs **18*a*, 18*b* and 19*a* and 19*b*. The legs are connected to frame structure to move between collapsed positions (see FIGS. 2 and 3) proximate the frame structure and extended positions (see FIG. 1) in which the frame structure 11** is supported on the legs wherein these extend generally downwardly in divergent relation, as indicated.

More specifically, retainers 20 connect the upper portions of legs **18*a* and 18*b* to the rightward end portions of frame members 12 and 13 in FIG. 1 to accommodate leg pivoting; and retainers 21 connect the upper portions of legs 19*a* and 19*b*** to the leftward end portions of the frame members to accommodate leg pivoting. Each leg pivotes in a plane generally parallel to the plane of the frame member to which it is attached.

Further, one of the two legs **18*a* and 19*a* (for example leg 19*a*) retained to frame member 12 extends closer to that frame member than the other leg (for example leg 18*a*) in collapsed position of the legs to facilitate nesting (see FIGS. 2 and 3); and one of the two legs 18*b* and 19*b* (for example leg 19*b*) retained to frame member 13 extends closer to that frame member than the other leg (for example leg 19*a*) in collapsed position of the legs, to facilitate nesting. To this end, spacer blocks 22 and 23 are interposed between the upper ends of legs 18*a* and 18*b* and frame member 12 and 13, the blocks being slightly thicker than the thickness of legs 19*a* and 19*b*. One retainer 20 extends through legs 18*a*, block 22 and member 12, and the other retainer extends through leg 18*b*, block 23 and member 13. The retainers may comprise bolts, and the legs 18*a* and 18*b* loosely swing on the bolts. Spacers 22 and 23 are separately joined (as by fasteners or bonding agent) to the members 12 and 13. Legs 19*a* and 19*b* pivot loosely on the retainers (such as bolts 21**).

In accordance with an important feature of the invention, flexible connector means is provided, and is operatively connected with the legs, to limit leg movement relatively away from one another at the extended positions of the legs, as for example is shown in FIG. 1. Such connector means may comprise one or more flexible cables or lines (NYLON twine, for example). More specifically, the flexible cable means may be operatively connected between the frame members 12 and 13 and the legs, and between the legs of each pair, to not only limit generally longitudinal swing of the legs about their retainers, but also to limit generally lateral swinging of the members 12 and 13 about their hinge axes (which extend longitudinally), all of which is seen in the example of FIG. 1.

More specifically, and as shown in that example, the flexible connector means includes a generally triangular cable 30 having:

(a) length 30*a* extending from a knot at hole 31 in member 12 to hole 32 in lower portion of leg 18*a*, with partial wrapping about that leg portion, for strength;

(b) length 30*b* extending from hole 32 to hole 33 in lower portion of leg 18*b*, with partial wrapping about that leg portion;

(c) length 30*c* extending from hole 33 to a knot at a hole 34 in member 13.

Similarly, the flexible connector means includes a cable 35 having:

(a) length 35*a* extending from a knot at hole 36 in member 12 to hole 37 in lower portion of leg 19*a;* with partial wrapping about that leg portion;

(b) length 35*b* extending from hole 37 to hole 38 in lower portion of leg 19*b* with partial wrapping about that leg portion;

(c) length 35*c* extending from hole 38 to hole 39 in member 13 and to a knot at that hole.

Note that the pair of holes 31 and 34 are closer to legs 19*a* and 19*b* than to legs 18*a* and 18*b*, in extended positions (FIG. 1); and that holes 36 and 39 are closer to legs 18*a* and 18*b*, than to legs 19*a* and 19*b* in that view. All the cables and lengths thereof are taut in fully extended, saw horse operating positions; on the other hand, all cables and their lengths are slack in collapsed positions, as is clear from FIG. 2. The use of such cables (cable 30 and cable 35) accommodates to full extension of the legs of each pair, on rough or smooth surfaces, i.e. with one leg extended somewhat more than another due to such surface roughness, with cable tautness indicating that the legs are fully extended and accommodated to the ground. Also, the extent of lateral pivoting of the members 12 and 13 to accommodate to support surface unevenness is accommodated by the cables, whereby a multi-mode, "synergistic", self-adjustment support of the saw horse elements is achieved, together with added provision for full collapse and nesting of the legs, for portability.

Additional advantages of the saw horse are listed as follows:

(a) it collapses into a single remaining entity, fully attached. No separate components.

(b) It collapses into nearly the cubic volume of materials used for maximum storage efficiency and portability.

(c) It derives its basic structural strength from twine, cord, NYLON rope or cord, cable, chain or other such material, which is a key factor in its collapsibility.

(d) The use of the synthetic cord provides the basic angular support eliminating the need for additional cross members for strength, thus reducing the weight and providing improved portability.

(e) The folded and compact configuration of the saw horse allows a carpenter to carry it easily in his car, truck or van to his work station. It also allows homeowner to find a suitable place for storage almost anywhere in the home.

(f) Since most of the structural strength is in the cords, the use of steel is unnecessary. It can be produced from light duty lumber or plastic. These latter two materials further reduce the weight and reduce the possibility of marring or scratching something during transportation or storage.

As appears in FIG. 1, each cable typically approaches a lower leg hole (as for example hole 33) via two drilled openings in the leg (see cable extents 30*b*′ and 30*b*″). Also the cable extent 30*c* passes at the inner side of a leg, as at 30*c*′ at the inner side of leg 18*b*.

FIG. 4 shows in section an alternate arrangement, wherein the cable extent 30*b* passes at 30*b*‴ at the outer side of leg 18*b*, for additional strength. Other wrap variations are possible.

I claim:

1. In a saw horse, the combination comprising (a) generally horizontally extending upper frame structure, (b) two pairs of legs pivotally connected to the frame structure to independently and swingably move toward each other between extended positions in which the frame structure is supported on the legs, and collapsed positions proximate that structure, and (c) flexible connector means operatively connected with the legs and the upper frame structure to limit such independent swinging movement of the pairs of legs relatively away from one another at said extended positions, (d) said upper frame structure including two longitudinally elongated frame members, the two legs of each of said pairs respectively connected to said members, and hinge means interconnecting said members to pivot laterally relative to one another, said flexible connector means also connected with said members to limit said member relative lateral pivoting.

2. The combination of claim 1 wherein said flexible connector means becomes taut when said legs arrive at said extended positions.

3. The combination of claim 1 wherein said flexible connector means extends from said members to said legs of each pair, and between the legs of each pair; and becomes taut when said legs arrive at said extended positions and when the legs of each pair have been spread apart accompanied by said lateral pivoting of said members.

4. The combination of claim 2 wherein said flexible connector means comprises at least one cable.

5. The combination of claim 3 wherein said flexible connector means comprises at least one cable.

6. The combination of claim 1 including retainers connecting the upper end portions of said legs to said members, one of the two legs pivotally connected to each of said members extending closer to that member than the other of said two legs, in collapsed positions of said legs.

7. The combination of claim 6 including a spacer located between said member and the upper end portion of the other of said two legs.

8. The combination of claim 3 wherein said members and said legs define holes to which the connector means extend.

9. The combination of claim 8 wherein said connector means extends between the lower portions of the legs of one pair to said members near the upper portion of the legs of the other pair, and between the lower portions of the legs of the other pair to said members near the upper portions of the legs of the one pair.

10. The combination of claim 9 wherein the connector means wraps at least partially about said lower portions of the legs.

11. In a saw horse, the combination comprising (a) generally horizontally and longitudinally extending upper frame structure, (b) two pairs of legs pivotally connected to the frame structure to independently and swingably move toward each other between downward extended positions in which the frame structure is supported on the legs and upper collapsed positions proximate that structure, and (c) flexible connector means operatively connected with the legs and the upper frame structure to limit such indenpendent swinging movement of the pairs of legs relatively away from one another at said extended positions, (d) said upper frame structure including two longitudinally elongated opposite sides, the two legs of each of said pairs respectively connected to said frame structure to diverge laterally and downwardly from said opposite sides in said extended positions, said flexible connector means also connected with said frame structure and legs to limit the extent of leg lateral divergence in said extended positions.

12. The combination of claim 11 wherein said flexible connector means comprises flexible lines extending from said upper frame structure to the legs of each pair, and between the legs of each pair, to become taut when the legs arrive at said extended positions.

* * * * *